United States Patent Office 3,804,953
Patented Apr. 16, 1974

3,804,953
FLAVORING MATERIALS AND METHOD OF PREPARING THE SAME
Alan P. Bentz, Stamford, Conn., and Richard Scarpellino, Ramsey, N.J., assignors to General Foods Corporation, White Plains, N.Y.
No Drawing. Filed Mar. 5, 1970, Ser. No. 16,935
Int. Cl. A23l *1/26*
U.S. Cl. 426—221                          10 Claims

ABSTRACT OF THE DISCLOSURE

Food flavoring materials are prepared by reacting hydrogen sulfide with carbonyl compounds in a dilute aqueous medium. The flavoring materials are stable in the aqueous medium and retain their high potency and quality when combined with an edible fixation agent and are dehydrated.

BACKGROUND OF THE INVENTION

Field of the invention

This invention relates, in general, to flavoring materials and a method of preparing the same. In particular, the invention is directed toward those flavoring compounds which are the products of chemical reactions between hydogen sulfide and certain carbonyl compounds when the reactions take place in a dilute aqueous medium.

DESCRIPTION OF THE PRIOR ART

Heretofore, chemical reactions between hydrogen sulfide and carbonyl compounds have been disclosed for the purpose of producing flavoring compositions or precursors flavoring components for foods when such reactions were achieved in nonaqueous media. The chemical reactions between hydrogen sulfide and certain aldehydes and ketones brought about by bubbling hydrogen sulfide through an aliphatic ester of a hydroxy polybasic acid solution of each of a number of carbonyl compounds are described in Barch, U.S. Pat. 2,594,379. Under the conditions disclosed in this patent and, specifically with the use of triethyl citrate as the solvent, many stable food flavoring materials have been reported.

In contradistinction, and, as disclosed in Barch, supra, when hydrogen sulfide is bubbled through a water solution of an aldehyde or a ketone, a heavy white precipitate of the tri-thio-polymer is obtained accompanied by soluble by-products of disagreeable odor—a distinctly different result from that obtained when an aliphatic ester of a hydroxy polybasic acid is employed as the solvent for the carbonyl compounds.

SUMMARY OF THE INVENTION

In view of the prior art, it has been surprisingly discovered that chemical reactions in an aqueous medium between hydrogen sulfide and each of a number of certain carbonyl compounds will, under certain conditions, produce excellent food flavoring materials. Furthermore, the food flavoring materials resulting from the chemical reactions according to this invention are stable in the aqueous medium over prolonged periods of time and also retain their original high potency and quality when combined with a fixative agent, such as a dextrin, and are then either freeze-dried or spray-dried.

The present invention is predicated on the discovery that satisfactory flavor materials are obtained only when the carbonyl/hydrogen sulfide reaction is permitted to take place in a dilute aqueous solution. The very essence of the invention resides in the unexpected finding that the carbonyl/hydrogen sulfide reactions must occur in the presence of a large excess of water in order to yield the desirable reaction products. Also, the most favorable results occur when the molar ratio of hydrogen sulfide to carbonyl compound at the start of the reaction ranges from about 0.5:1 to about 1.5:1. Under these conditions, it is possible, by using any one of a number of aliphatic aldehydes or ketones as one of the reactants with hydrogen sulfide to produce a variety of satisfactorily stable food flavoring materials of high quality.

It will thus be appreciated that the products of this invention provide for stable flavoring materials for use in foods.

It is another object of this invention to provide stable food flavoring adjuvants in dry powder form.

It is still another object of this invention to provide a variety of food flavoring adjuvants which find excellent utility in meat and vegetable preparations.

These and other objects, features and advantages of the present invention will hereinafter appear, and, for the purpose of illustration but not limitation, exemplary embodiments of the present invention are hereinafter described in detail.

DESCRIPTION OF THE PREFERRED EMBODIMENTS

In accordance with the present invention, it has been found that a saturated aqueous solution of hydrogen sulfide when added and mixed with an approximate equal volume of aqueous carbonyl compound solution wherein the concentration of carbonyl compound ranges from about 0.05 to about 0.25 weight percent (after the hydrogen sulfide addition), will yield, upon moderate agitation followed by standing at room temperature, a dilute solution of flavoring material having stability over prolonged periods of time.

Many carbonyl compounds undergoing the reaction with hydrogen sulfide yield satisfactory food flavoring materials having flavor notes organoleptically identical to those natural counterparts emanating from foodstuffs. The following table lists the flavor notes yielded by the reactions of representative carbonyl compounds with hydrogen sulfide according to the method of this invention.

TABLE I

| Carbonyl compound: | Flavor note |
|---|---|
| 2,3-pentanedione | Cooked egg/fried butter. |
| Hexaldehyde | Fresh green pepper. |
| Pyuvaldehyde | Spiced meat/liverwurst. |
| Isobutyraldehyde | Boiled onion. |
| Isovaleraldehyde | Witch hazel/fruity. |
| Acetaldehyde | Meat loaf/onion. |
| 2-hexenal | Turkey white meat. |

The reaction of each of the carbonyl compounds with hydrogen sulfide appears to take place immediately and, although the time period varies for each reaction to reach substantially completion, in practically all instances the reaction between the carbonyl compound and hydrogen sulfide is completed after the dilute aqueous mixture is gently agitated and then permitted to stand for a period ranging from about 16 to 18 hours at 20–25° C. With some of the carbonyl compounds, however, the intensity and quality of the odor from the reaction product is not fully developed until the aqueous mixture is permitted to stand for about a week at room temperature.

Chromatographic analyses show each of the carbonyl reactants to produce a multiplicity of reaction products. Although work is continuing in order to chromatographically separate and identify each of the many reaction compounds, for purposes of this invention, it has been found that no fractionation of the products of the reactions is necessary for the ultimate production of highly desirable flavoring materials.

The dilute solution of food flavoring materials can be employed in compounding a variety of food compositions. Preferably, after the dilute flavor material solution is allowed to stand for a period up to about 16–18 hours at room temperature conditions, dextrins or other conventional fixative materials are added to the solution to the extent of about 10% by weight of the dilute solution and thoroughly mixed. The aqueous mixture of fixative material, residual unreacted compounds, and the flavor materials is then freeze-dried or spray-dried by any one of a number of well-known conventional techniques.

The freeze-dried or spray-dried solids are, for the most part, white, powdery material of low density having the desirable, potent flavorable notes as characterized in the representative list shown in Table I, and having excellent utility as flavor enhancers in various food compositions.

It is not to be inferred that all carbonyl compounds, when reacted with hydrogen sulfide under the above described conditions, will produce reaction products suitable for food flavor use. Among the more than thirty carbonyl compounds employed in the inventive procedure, Table I lists the most promising. Other carbonyl compounds, while undergoing similar reactions, are less effective and still others produce either unsatisfactory reaction products or are nonreactive within the operative conditions of the invention. For purposes of this invention, it is contemplated that those carbonyl compounds which are operative and produce desirable food flavoring materials are restricted to water soluble aliphatic carbonyl compounds having 6 carbons and are either aldehydes or ketones of the mono or dicarbonyl types. The unsaturated compounds may be alpha, beta unsaturated carbonyls.

Surprisingly, in order for the reactants to succeed in producing the desirable flavoring materials, the aqueous solution of each of the carbonyl compounds must be diluted to the extent wherein the concentration of carbonyl compound ranges from about 0.1 percent to about 0.5 percent on a weight basis (before the addition of hydrogen sulfide) and the added saturated solution of hydrogen sulfide must be of sufficient quantity to supply a molar ratio of hydrogen sulfide to carbonyl ranging from about 0.5 to about 1.5.

As previously mentioned, the reaction proceeds immediately at room temperature (20–25° C.) conditions and completion is substantially attained after standing at these temperature conditions for 16 hours to 18 hours. At a temperature of 50° C. the reactions of hydrogen sulfide with most of the carbonyl compounds, appears to be complete within one hour. In all instances a small amount of colloidal sulfur precipitate may form as the reaction proceeds. This precipitate may optionally be removed by filtration, centrifugation, etc. before the addition of the fixative agent to the solution.

The fixative agent may be any one of a number of gums and dextrins, and experience has shown the best results are obtained when the fixative is added to the dilute solution of flavor material products of the reaction to the extent of about 20 to about 35 percent based on the weight of the dilute solution. At this concentration, the mixture may be conventionally spray-dried or, if preferred, freeze-dried to provide the desired food flavoring material in dried powdered form.

In order to more fully clarify the invention, the following example is set forth to illustrate a typical reaction according to the invention. Additional examples are presented to illustrate the utility of the food flavoring materials. It should be understood, however, that the examples are merely meant to be illustrative and the invention is not to be limited thereto.

EXAMPLE I

Reaction product of 2,3-pentanedione with hydrogen sulfide a. Procedure:

(1) A saturated solution of hydrogen sulfide in water was prepared by slowly bubbling the hydrogen sulfide through one liter of water for 30 minutes. (Normality by iodine titration—0.06–0.15.)
(2) An aqueous solution of 2,3-pentanedione containing 0.25 gram/100 ml. was prepared.
(3) Equal volumes of the two solutions were combined and mixed and then allowed to stand in a stoppered flask at room temperature for about 18 hours.

b. Results:

(1) The clear mixture started to cloud after 20 minutes and gradually formed a white, milky suspension. This precipitate was demonstrated to be free colloidal sulfur (melting point determination) and turbidimetrically was shown to form at a first order rate.
(2) Although the 2,3-pentanedione immediately started to disappear at a second order reaction rate, the desired food flavoring material reaction product did not appear (as measured by gas chromatography) until the mixture had stood for about 18 hours.
(3) The resulting solution had a buttery-eggy odor and was stable over a prolonged period of time.

EXAMPLE II

Freeze-dried reaction product of 2,3-pentanedione with hydrogen sulfide (1) To 20 ml. of the unfiltered solution of food flavoring reaction product of Example I was slowly added 5 grams of commercial food grade dextrin and the mixture vigorously agitated.
(2) The mixture of (1) above was freeze-dried to yield a stable powder having an eggy-buttery-onion odor.

EXAMPLE III

Spray-dried reaction product of 2,3-pentanedione with hydrogen sulfide (1) To 225 ml. of the unfiltered solution of food flavoring reaction product of Example I was slowly added 75 grams of commercial food grade dextrin and the mixture vigorously agitated.
(2) The mixture of (1) above was spray-dried to yield a stable powder with an eggy-buttery-onion odor.

EXAMPLE IV

The spray-dried product of Example III was evaluated as a flavor adjuvant in an extended scrambled egg mixture. To 50 grams of the extended scrambled egg mixture which contained whole egg solids, salt, sugar, water and a humectant was added 0.1 ml. of a 1% (weight basis) aqueous solution of the dextrin fixed product of Example III. After thoroughly mixing the resulting mixture was fried to yield a product with a good egg odor and flavor. Without the flavor material of Example III, the extended egg mixture, when fried, did not have an acceptable flavor. A taste comparison of the two fried products showed the flavor adjuvant to have masked the sweetness factor of the humectant and to have extended the flavor of the egg solids.

EXAMPLE V

As in Example I, equal volumes of a saturated solution of hydrogen sulfide in water and a solution containing 0.25 gram of 2,3-pentanedione per 100 ml. of water were mixed together. To this was added 25% by weight commercial food grade dextrin and the entire mixture was heated to 50° C. for 15 minutes prior to freeze-drying. The elevated temperature accelerated the flavor development and effected a more oniony flavor than that produced in the product of Example I.

EXAMPLE VI

A 100 ml. of saturated hydrogen sulfide in water solution was prepared and diluted with an equal volume of water. To this was added 1.5 ml. of 30% pyruvaldehyde solution in water. After 24 hours a white colloidal precipitate had formed and a slight meat odor had developed. The solution was allowed to stand at room temperature for a week in a stoppered flask, after which time a distinct luncheon meat or liverwurst-type odor had developed and the solution had darkened in color to a deep pink.

EXAMPLE VII

The filtered reaction mixture of Example VI was added to the extent of 0.1% to a flavored vegetable protein which was then autoclaved in an atmosphere of steam at 10 p.s.i.g. for 10 minutes. The product exhibited a distinct meat flavor enhancement when compared with a control which had been similarly processed but without the addition of the flavor adjuvant of Example VI.

In view of the above, it will be seen that the several objects of the invention are achieved and other advantageous results obtained.

Upon consideration of the foregoing, it will become apparent to those skilled in the art that various modifications may be made without departing from the invention embodied herein. Therefore, only such limitations should be imposed as are indicated by the spirit and scope of the appended claims.

What is claimed and desired to be secured by Letters Patent is:

1. A method of preparing a food flavoring material which comprises reacting hydrogen sulfide with a carbonyl compound selected from the group consisting of aliphatic aldehydes and aliphatic methyl ketones whose longest chain contains not more than 6 carbons, in a dilute aqueous solution wherein the concentration of carbonyl compound ranges from about 0.05 to about 0.25 weight percent and the mole ratio of hydrogen sulfide to carbonyl compound initially present is from about 0.5:1 to about 1.5:1.

2. The flavoring material product according to the method of claim 1.

3. A food composition containing the food flavoring material according to the method of claim 1.

4. The method of claim 1 including the additional step of fixing the resulting flavor material with a water soluble edible fixative material and dehydrating the fixed flavor material.

5. The method of claim 4 wherein the water soluble edible fixative material is selected from the group consisting of dextrins and gums.

6. A food composition containing the food flavoring material according to the method of claim 4.

7. The method of claim 4 wherein the fixed flavor material is dehydrated by spray-drying.

8. The food flavoring material product according to the method of claim 7.

9. The method of claim 4 wherein the fixed flavor material is dehydrated by freeze-drying.

10. The food flavoring material product according to the method of claim 9.

References Cited

UNITED STATES PATENTS

| | | | |
|---|---|---|---|
| 3,645,754 | 2/1972 | Wiener | 99—140 R |
| 3,642,497 | 2/1972 | Gunther | 99—140 R |
| 3,578,465 | 5/1971 | Van Der Zijden | 99—140 R |
| 3,650,771 | 3/1972 | Wiener II | 99—140 R |
| 3,394,015 | 7/1968 | Giacino | 99—140 |
| 3,482,988 | 12/1969 | Kaleda | 99—140 |

FOREIGN PATENTS

| | | | |
|---|---|---|---|
| 227,956 | 4/1958 | Australia | 99—140 |

MORRIS O. WOLK, Primary Examiner

S. MARANTZ, Assistant Examiner

U.S. Cl. X.R.

426—211